United States Patent
Kojima et al.

(10) Patent No.: US 12,081,155 B2
(45) Date of Patent: Sep. 3, 2024

(54) MOTOR CONTROL DEVICE AND ABNORMALITY DETECTION METHOD FOR CURRENT DETECTOR PROVIDED IN MOTOR CONTROL DEVICE

(71) Applicant: OKUMA Corporation, Aichi (JP)

(72) Inventors: Ai Kojima, Aichi (JP); Yuji Uchida, Aichi (JP); Takeshi Sakai, Aichi (JP)

(73) Assignee: OKUMA CORPORATION, Aichi (JP)

( * ) Notice: Subject to any disclaimer, the term of this patent is extended or adjusted under 35 U.S.C. 154(b) by 135 days.

(21) Appl. No.: 17/973,278

(22) Filed: Oct. 25, 2022

(65) Prior Publication Data
US 2023/0126273 A1  Apr. 27, 2023

(30) Foreign Application Priority Data
Oct. 27, 2021 (JP) ................. 2021-175896

(51) Int. Cl.
*H02P 29/024* (2016.01)
*H02P 21/14* (2016.01)
(Continued)

(52) U.S. Cl.
CPC ............ *H02P 29/027* (2013.01); *H02P 21/14* (2013.01); *H02P 21/22* (2016.02); *H02P 27/08* (2013.01)

(58) Field of Classification Search
CPC ...... H02P 29/027; H02P 29/028; H02P 27/00; H02P 27/04; H02P 27/06; H02P 27/08; H02P 27/085; H02P 21/00; H02P 21/22; H02P 21/14; H02P 21/20; H02P 23/00; H02P 23/07; H02P 23/14; H02P 25/00; H02P 25/062; H02P 25/064; H02P 25/089; H02P 25/107; H02P 6/00; H02P 6/28; H02P 6/32; H02P 1/24; H02P 1/26; H02P 1/42; H02P 1/423; H02P 1/46; H02P 25/03
See application file for complete search history.

(56) References Cited

U.S. PATENT DOCUMENTS

| 2014/0091740 A1 | 4/2014 | Suzuki et al. |
| 2014/0156144 A1* | 6/2014 | Hoshi ................. H02P 29/0241 318/400.15 |

FOREIGN PATENT DOCUMENTS

| JP | 2001157460 A | 6/2001 |
| JP | 2014073009 A | 4/2014 |

* cited by examiner

*Primary Examiner* — Antony M Paul
(74) *Attorney, Agent, or Firm* — CANTOR COLBURN LLP

(57) ABSTRACT

A motor control device includes an abnormality determination unit that determines the presence of any abnormality in a current detector. The abnormality determination unit includes, for example, a U-phase abnormality determination device. The U-phase abnormality determination device calculates, as a voltage command threshold, a value obtained by adding a dead time voltage error, which is a voltage error occurring due to a dead time, to an ideal voltage command threshold, which is a value obtained by multiplying a prescribed reference current value by a motor resistance value, and outputs a signal indicating an abnormality in the current detector when the effective value of a voltage command value is equal to or greater than the voltage command threshold and the effective value of a current detection value is equal to or less than a current detection threshold that is lower than the reference current value.

8 Claims, 5 Drawing Sheets

(51) Int. Cl.
*H02P 21/22* (2016.01)
*H02P 27/08* (2006.01)

MOTOR CONTROL DEVICE AND ABNORMALITY DETECTION METHOD FOR CURRENT DETECTOR PROVIDED IN MOTOR CONTROL DEVICE

CROSS REFERENCE TO RELATED APPLICATION

The present invention claims priority under 35 U.S.C. § 119 to Japanese Application, 2021-175896, filed on Oct. 27, 2021, the entire contents of which being incorporated herein by reference.

TECHNICAL FIELD

The present specification discloses a motor control device that performs PMW control to apply voltage to a three-phase motor, and a method for detecting an abnormality in a current detector provided in this motor control device.

BACKGROUND

Motor control devices used in machine tools and the like are configured to protect motors, inverters, and the like from overcurrent based on current detection values. If an abnormality occurs in a current detector, the current detector will have difficulty detecting the overcurrent and accordingly will fail in the protection. Therefore, various abnormality detection methods for current detectors have been considered.

For example, in the case of providing current detectors for all power lines, the three-phase sum of three-phase AC currents of U-phase, V-phase, and W-phase is zero. Therefore, an abnormality occurring in the current detectors can be easily detected.

Further, even in the case of providing a current detector for only one phase, it is feasible to detect an abnormality occurring in the current detector of this phase by utilizing the principle that a value obtained by multiplying a current value by a motor resistance value is a voltage value.

Patent Document 1 discloses a method for detecting an abnormality in a current detector from current detection values of two phases. On a dq-axis plane, which is a rotary coordinate system, utilizing the principle that three phases of a fixed coordinate system rotate relatively, and performing motor driving control based on the current detection value of one phase enable detection of an abnormality in the current detector in a state where the influence of feedback by current control is avoided.

Patent Document 2 discloses that, when the current detection value is zero, detecting voltage fluctuations in pre-PWM control DC voltage output by a converter enables detection of an abnormality occurring in a current detector while the motor is not rotating. Further, since the abnormality detection is performed based on the current detection value of each current detector, it is possible to identify a current detector in which an abnormality has occurred.

CITATION LIST

Patent Literature

Patent Document 1: JP 2014-073009 A
Patent Document 2: JP 2001-157460 A

In a motor driving device used for a machine tool or the like, if an abnormality occurs in a current detector while a motor is driving, some abnormality will be detected, since the motor will be unable to follow a command. However, when a rotor is in a specific position in a state where the motor is stopped, there is a phase in which the motor does not rotate even when the current flows. In such a case, if the current detection value becomes 0 because of the abnormality in the current detector, the command voltage will increase while no other abnormality is detected, and therefore overcurrent may flow through the motor or the power line, resulting in burnout. Therefore, it is necessary to detect an abnormality in the current detector while the motor is stopped.

In the case of utilizing the principle that the three-phase sum of three-phase AC currents of U-phase, V-phase, and W-phase is zero in order to detect an abnormality in the current detector, it is necessary to provide a dedicated current detector on each of the electric wires. However, performing motor driving control based on current detection values of two phases by utilizing the principle that the three-phase sum of three-phase AC currents is zero requires an increase in the number of current detectors, which will result in increased cost and device size.

Further, in the case of detecting an abnormality of the current detector by utilizing the principle that a value obtained by multiplying the current value by the motor resistance value is the voltage value, no dead time voltage error is taken into consideration. Therefore, if the dead time voltage error is large, an erroneous detection determining that it is "abnormal" will occur even though there is no abnormality in the current detector. If a margin is set to avoid such an erroneous detection, this will raise a problem that the occurrence of an abnormality cannot be promptly detected when the dead time voltage error is small, which leads to occurrence of detection failure.

The technique disclosed in Patent Document 1 utilizes the principle that the three phases of the fixed coordinate system rotate relatively on the dq-axis plane, which is the rotary coordinate system. Therefore, it is difficult to detect an abnormality in the current detector while the motor is stopped. Further, it is difficult to identify a current detector in which an abnormality has occurred.

The technique disclosed in Patent Document 2 refers to voltage fluctuations of the DC voltage output by the converter to detect an abnormality in the current detector when the current detection value is zero. Therefore, the abnormality can be detected even while the motor is stopped. However, in industrial machines such as machine tools, usage of a plurality of motors is usual, and two or more motor control devices may be connected to one converter. In this case, voltage fluctuations possibly occur due to the influence when driving other motors. Therefore, an erroneous detection will occur if another motor connected to the same converter operates while an object motor is stopped.

SUMMARY

The motor control device disclosed in the present specification is a motor control device that controls driving of a three-phase motor and includes a current control unit configured to output a voltage command value for each of three phases, a PWM control unit configured to convert a DC voltage output from a converter into an AC voltage by modulating a pulse width of switching according to the voltage command value and apply the converted voltage to a power line of each of three phases of the three-phase motor, one or more current detectors provided for at least one of three-phase power lines to detect the value of current flowing through the power line, as a current detection value, and an abnormality determination unit configured to determine the presence of any abnormality in the current detector. The abnormality determination unit calculates, as a voltage command threshold, a value obtained by adding a dead time voltage error, which is a voltage error occurring due to a dead time of the switching, to an ideal voltage command threshold, which is a value obtained by multiplying a prescribed reference current value by a motor resistance value, and outputs a signal indicating an abnormality in the current detector when the effective value of the voltage command value is equal to or greater than the voltage command threshold and the effective value of the current detection value is equal to or less than a current detection threshold that is lower than the reference current value.

In this case, the abnormality determination unit may calculate, as the dead time voltage error, a value obtained by multiplying the dead time by a carrier frequency and a power supply voltage value of the DC voltage.

Further, the current control unit may include a dead time compensator that outputs, as the voltage command value for each of three phases, a value obtained by adding a dead time compensation value to a pre-compensation voltage command value for each of three phases calculated based on a torque command value. When a current command value exceeds a prescribed dead time compensation current parameter, the dead time compensator may calculate the dead time compensation value that is equal to a prescribed dead time compensation voltage parameter. When the current command value is equal to or less than the dead time compensation current parameter, the dead time compensator may calculate the dead time compensation value that is a value obtained by multiplying the dead time compensation voltage parameter by a ratio of the current command value to the dead time compensation current parameter.

Further, the abnormality determination unit may calculate, as the dead time voltage error, a value obtained by multiplying the dead time by the carrier frequency and the power supply voltage value of the DC voltage. Further, the abnormality determination unit may calculate the dead time voltage error that is equal to the dead time compensation voltage parameter.

Further, the abnormality determination unit may calculate, as a dead time voltage error calculated value, the value obtained by multiplying the dead time by the carrier frequency and the power supply voltage value of the DC voltage, and may calculate, as the dead time voltage error, the larger of the dead time compensation voltage parameter and the dead time voltage error calculated value.

Further, the abnormality determination unit may calculate, as the dead time voltage error calculated value, the value obtained by multiplying the dead time by the carrier frequency and the power supply voltage value of the DC voltage, and may calculate, as the dead time voltage error, the smaller of the dead time compensation voltage parameter and the dead time voltage error calculated value.

An abnormality detection method for a current detector disclosed in the present specification includes calculating, as a voltage command threshold, a value obtained by adding a dead time voltage error, which is a voltage error occurring due to a dead time of switching for applying voltage to a motor, to an ideal voltage command threshold, which is a value obtained by multiplying a prescribed reference current value by a motor resistance value, and outputting a signal indicating an abnormality in the current detector when the effective value of a voltage command value is equal to or greater than the voltage command threshold and the effective value of a current detection value detected by the current detector is equal to or less than a current detection threshold that is lower than the reference current value.

According to the technique disclosed in the present specification, the abnormality determination is performed using the voltage command value of each phase, the current detection value, and the threshold reflecting the dead time voltage error. Therefore, abnormalities can be promptly detected, without erroneous detections, before excessive current flows.

BRIEF DESCRIPTION OF DRAWINGS

Embodiments of the present disclosure will be described based on the following figures, wherein.

DESCRIPTION OF EMBODIMENTS

Figure 1:
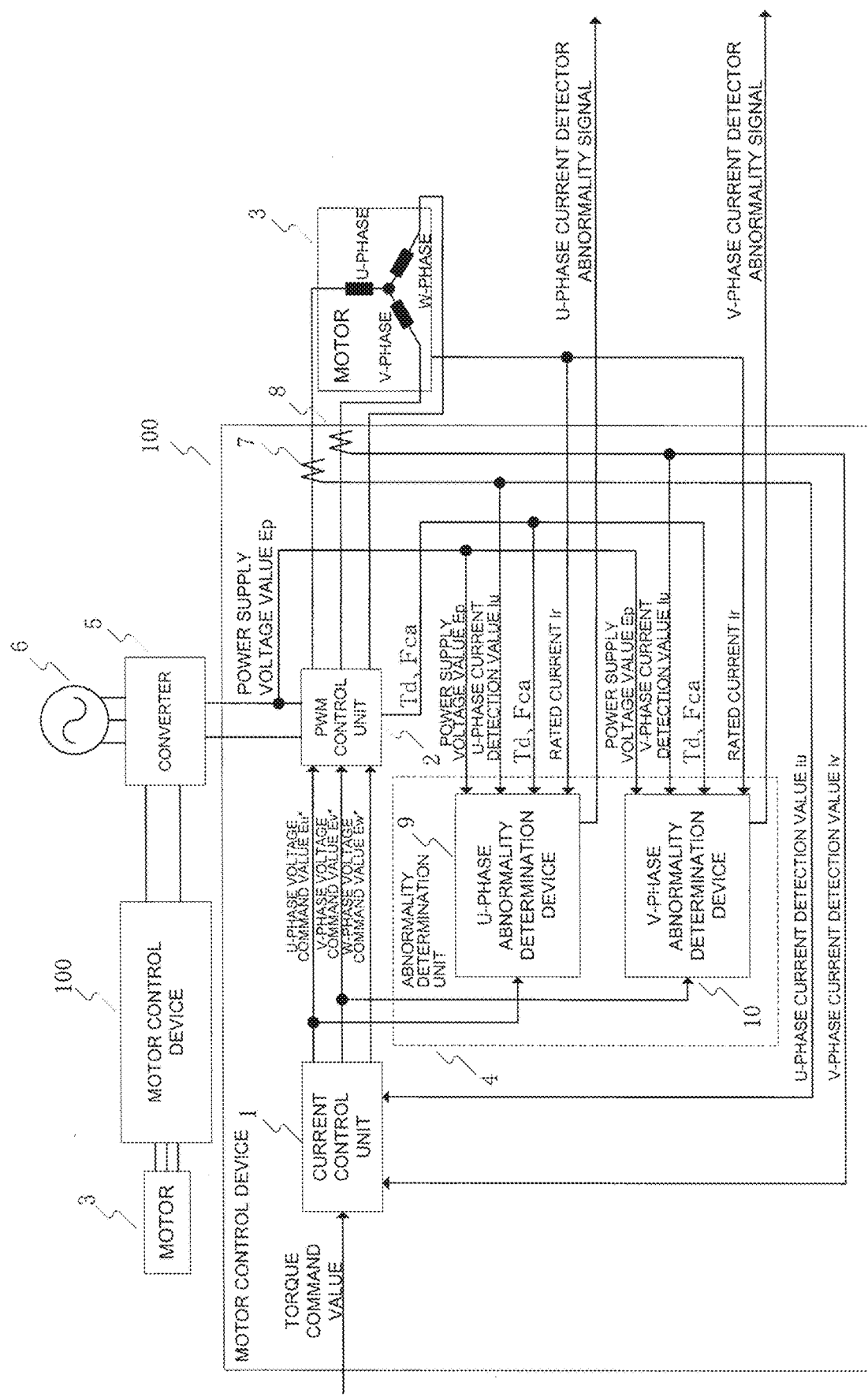
FIG. 1 is a block diagram illustrating an exemplary configuration of a motor control device.

FIG. 1 is a block diagram illustrating a motor control device. A converter 5 is connected, on its input side, to a three-phase AC power supply 6 and outputs a DC voltage having a power supply voltage value Ep. This converter 5 is connected to one or more (two in the illustrated example) motor control devices 100. The motor control device 100 includes a current control unit 1 that receives a torque command value output by a superordinate control device (not illustrated) and calculates voltage command values Eu*, Ev*, and Ew* for driving a three-phase motor 3, a PWM control unit 2 that converts DC voltage into a three-phase AC voltage by modulating the pulse width of switching according to the voltage command values Eu*, Ev*, and Ew* and applies the converted voltage to respective motor power lines, a current detector 7 that detects U-phase current, a current detector 8 that detects V-phase current, a U-phase abnormality determination device 9 that detects an abnormality in the current detector 7, and a V-phase abnormality determination device 10 that detects an abnormality in the current detector 8. Physically, the current control unit 1, the PWM control unit 2, the U-phase abnormality determination device 9, and the V-phase abnormality determination device 10 may be configured by a computer including a processor and a memory or may be configured by an electric circuit. Further, the PWM control unit 2 performs pulse width modulation using a carrier wave having a predetermined carrier frequency Fc. Further, in the switching, a predetermined dead time Td is provided.

Figure 2:
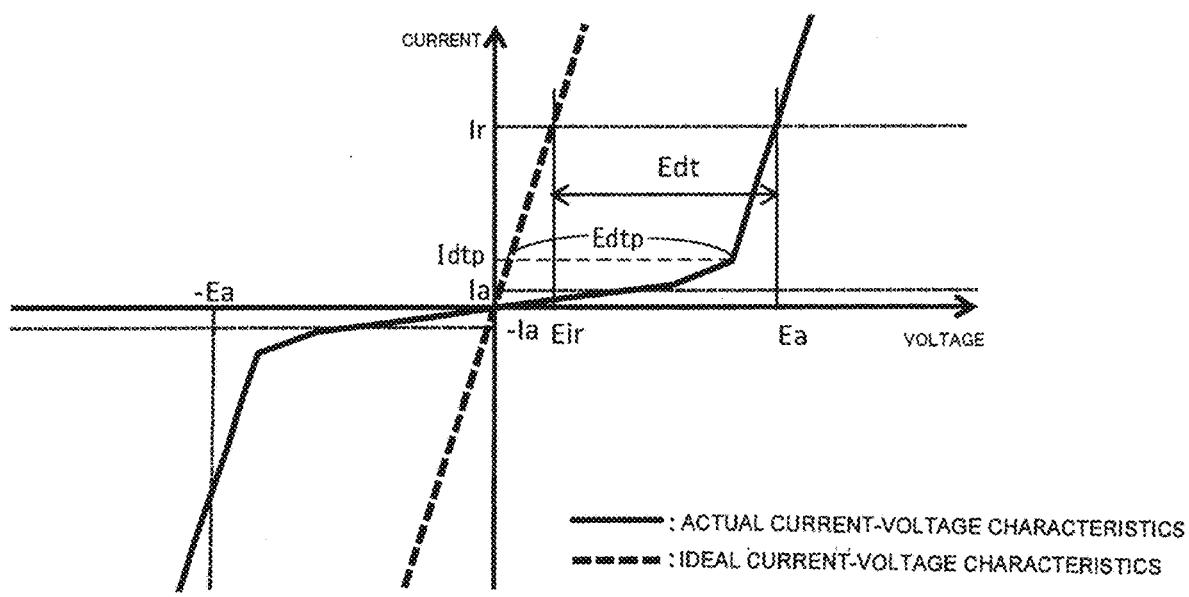
FIG. 2 is a drawing illustrating an example of current-voltage characteristics.

The U-phase abnormality determination device 9 and the V-phase abnormality determination device 10 use a voltage command threshold Ea and a current detection threshold Ia based on current-voltage characteristics to determine an abnormality in the current detector based on the voltage command value and the current detection value. In FIG. 2, a solid line represents actual current-voltage characteristics in which a voltage error occurs due to the dead time in the PWM control. A dashed line in FIG. 2 represents ideal current-voltage characteristics in the case where there is no dead time, in which a value obtained by multiplying a current value by a motor resistance value is expressed as a voltage value. As is widely known, a dead time voltage error Edt is a value obtained by multiplying the dead time Td by a carrier frequency Fca and the power supply voltage value Ep. That is, Edt=Td×Fca×Ep.

The U-phase abnormality determination device 9 determines that an abnormality has occurred in the current detector 7 when a U-phase voltage command effective value is equal to or greater than the predetermined voltage command threshold Ea and a U-phase current detection effective value is equal to or less that the predetermined current detection threshold Ia, and outputs a U-phase current detector abnormality signal to the superordinate control device (not illustrated). The V-phase abnormality determination device 10 performs similar processing.

The voltage command threshold Ea and the current detection threshold Ia are set based on a reference current Idef. No particular limitation is imposed on the value of the reference current Idef so long as it is smaller than an allowable maximum current. Accordingly, for example, a rated current Ir that can be continuously supplied may be treated as the reference current Idef.

The voltage command threshold Ea is an actual voltage value when the reference current Idef flows. For example, when assuming that the rated current Ir is the reference current Idef, the voltage value when the rated current Ir flows is theoretically a value obtained by multiplying the rated current Ir by the motor resistance value, which is an ideal voltage command threshold Eir in FIG. 2. However, in reality, since the dead time voltage error Edt is inevitable, the actual voltage value when the rated current Ir flows is a value obtained by adding the dead time voltage error Edt to the ideal voltage command threshold Eir. Therefore, this example uses the following formula (1) to calculate the voltage command threshold Ea. Using such a value as the voltage command threshold Ea enables prompt detection of abnormalities in the current detectors 7 and 8 before current not less than the rated current Ir flows.

$$Ea=Eir+Edt \quad (1)$$

No particular limitation is imposed on the current detection threshold Ia so long as it is lower than the reference current Idef. In other words, in this example, a value lower than the current to be supplied when the voltage command effective value is the voltage command threshold Ea is set as the current detection threshold Ia. For example, in this example, the voltage command threshold Ea is obtained with reference to the rated current Ir. If the voltage command effective value becomes the voltage command threshold Ea in a state where there is no abnormality in the current detectors 7 and 8, the detected current value should be equivalent to the rated current Ir. Therefore, in this example, the current detection threshold Ia is set as a value lower than the rated current Ir, and more specifically, a value obtained by multiplying the rated current Ir by an appropriate multiplier "A" that is not smaller than 0 and is less than 1, as expressed by the following formula (2). The multiplier "A" may be a value determined in consideration of circuit errors, calculation errors, and margins. However, in this example, under the assumption that the current detection value becomes substantially zero in the event of failure occurring in the current detectors 7 and 8, the current detection threshold Ia is set to be, for example, 0.5% of the rated current Ir; that is, a value obtained when A=0.005.

$$Ia=Ir \times A(0 \leq A<1) \quad (2)$$

As described above, in this example, the actual voltage value when the reference current Idef flows is calculated in consideration of the dead time voltage error Edt. This actual voltage value is set as the voltage command threshold Ea. Further, a value smaller than the reference current Idef is set as the current detection threshold Ia. In this case, when the current detection value is smaller than the current detection threshold Ia even though the voltage effective value is equal to or greater than the voltage command threshold Ea, it is feasible to determine that any abnormality has occurred in the current detectors 7 and 8. Further, since the voltage command threshold Ea is a value reflecting the dead time voltage error Edt, erroneous detection and detection failure can be prevented effectively.

Figure 3:
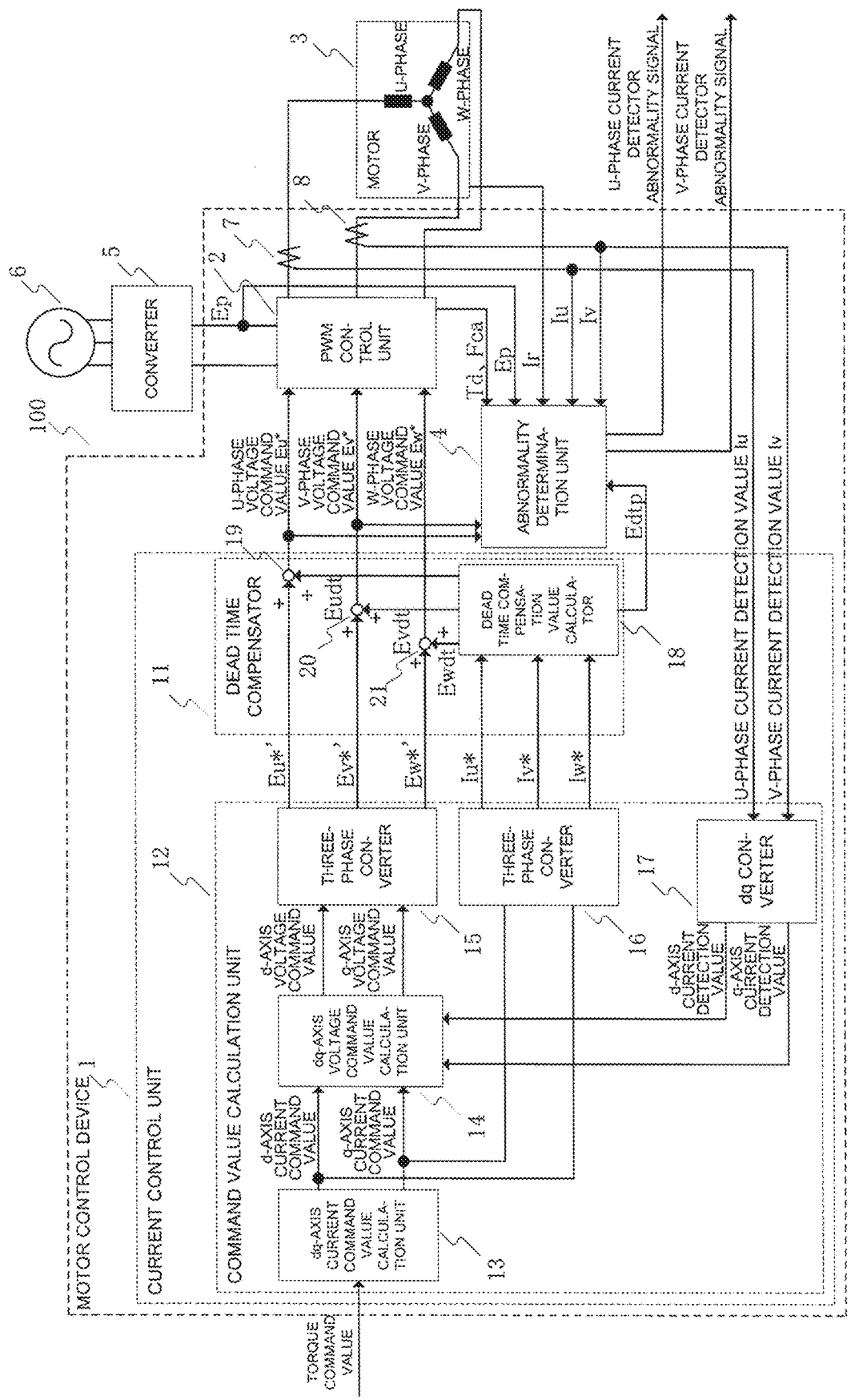
FIG. 3 is a block diagram illustrating another exemplary configuration of the motor control device.

Next, another exemplary technique for detecting any abnormality in the current detectors 7 and 8 will be described with reference to FIG. 3. A motor control device 100 of FIG. 3 differs from the motor control device 100 of FIG. 1 in that dead time compensation is added. Therefore, the same configurations are denoted by the same reference numerals and the description thereof will be omitted. In the example of FIG. 1, U-phase, V-phase, and W-phase voltage command values Eu*, Ev*, and Ew* in the fixed coordinate system are output from the current control unit 1 but performing dq conversion inside the current control unit 1 is feasible. A current control unit 1 illustrated in FIG. 3 includes a command value calculation unit 12 and a dead time compensator 11. The command value calculation unit 12 includes a dq-axis current command value calculation unit 13, a dq-axis voltage command value calculation unit 14, three-phase converters 15 and 16, and a dq converter 17.

The dq-axis current command value calculation unit 13 calculates a d-axis current command value and a q-axis current command value in a dq rotary coordinate system from a torque command value output by a superordinate control device (not illustrated). The dq converter 17 converts a U-phase current detection value Iu and a V-phase current detection value Iv in the fixed coordinate system into a d-axis current detection value and a q-axis current detection value in the dq rotary coordinate system. The dq-axis voltage command value calculation unit 14 obtains a d-axis voltage command value before dead time compensation from the d-axis current command value and the d-axis current detection value and obtains a q-axis voltage command value before dead time compensation from the q-axis current command value and the q-axis current detection value. The three-phase converter 15 performs inverse dq conversion to convert the d-axis voltage command value before dead time compensation and the q-axis voltage command value before dead time compensation in the dq rotary coordinate system into voltage command values Eu*', Ev*', and Ew*' before dead time compensation in the fixed coordinate system. Further, the three-phase converter 16 performs inverse dq conversion to convert the d-axis current command value and the q-axis current command value in the dq rotary coordinate system output from the dq-axis current command value calculation unit 13 into current command values Iu*, Iv*, and Iw* in the fixed coordinate system.

The dead time compensator 11 includes a dead time compensation value calculator 18. The dead time compensation value calculator 18 calculates a U-phase dead time compensation value Eudt, which is added to the dead time pre-compensation U-phase voltage command value Eu*' in the dead time compensator 11. The dead time compensation value calculator 18 calculates a V-phase dead time compensation value Evdt, which is added to the dead time pre-compensation V-phase voltage command value Ev*' in the dead time compensator 11. The dead time compensation value calculator 18 calculates a W-phase dead time compensation value Ewdt, which is added to the dead time pre-compensation W-phase voltage command value Ew*' in the dead time compensator 11. The dead time compensation value calculator 18 performs calculation for each of the U-phase dead time compensation value Eudt, the V-phase dead time compensation value Evdt, and the W-phase dead time compensation value Ewdt, but only the U phase will be described below.

The dead time compensation value calculator 18 has a dead time compensation voltage parameter Edtp and a dead time compensation current parameter Idt for each motor. The dead time compensation current parameter Idt is a current value at which the dead time voltage error Edt begins to stabilize, and the dead time compensation voltage parameter Edtp is the dead time voltage error Edt after stabilization. That is, as illustrated in FIG. 2, the dead time voltage error Edt increases with increasing voltage in a region in which the current is less than a predetermined value; that is, the dead time compensation current parameter Idt. On the other hand, in a region in which the current is equal to or greater than the dead time compensation current parameter Idt, the dead time voltage error is stabilized at the dead time compensation voltage parameter Edtp that is a predetermined value.

When the U-phase current command value Iu* exceeds the dead time compensation current parameter Idt, the dead time compensation value calculator 18 outputs the dead time compensation voltage parameter Edtp as the U-phase dead time compensation value Eudt, as in the following formula (3). When the U-phase current command value Iu* is equal to or less than the dead time compensation current parameter Idt, the dead time compensation value calculator 18 outputs, as the U-phase dead time compensation value Eudt, a value obtained by multiplying the dead time compensation voltage parameter Edtp by a ratio of the U-phase current command value Iu* to the dead time compensation current parameter Idt, as in the following formula (4).

$$Eudt=Edtp(Iu^*>Idt) \quad (3)$$

$$Eudt=Edtp \times (Iu^*/Idt)(Iu^* \le Idt) \quad (4)$$

Here, the rated current Ir (and thus the reference current Idef) is equal to or greater than the dead time compensation current parameter Idt. Therefore, using the dead time compensation voltage parameter Edtp as the dead time voltage error Edt in the U-phase abnormality determination device 9 and the V-phase abnormality determination device 10 of the abnormality determination unit 4 makes it possible to easily perform abnormality determination without having extra parameters. However, the dead time compensation voltage parameter Edtp is a parameter tuned for each motor, and some error is inevitable.

Figure 4:
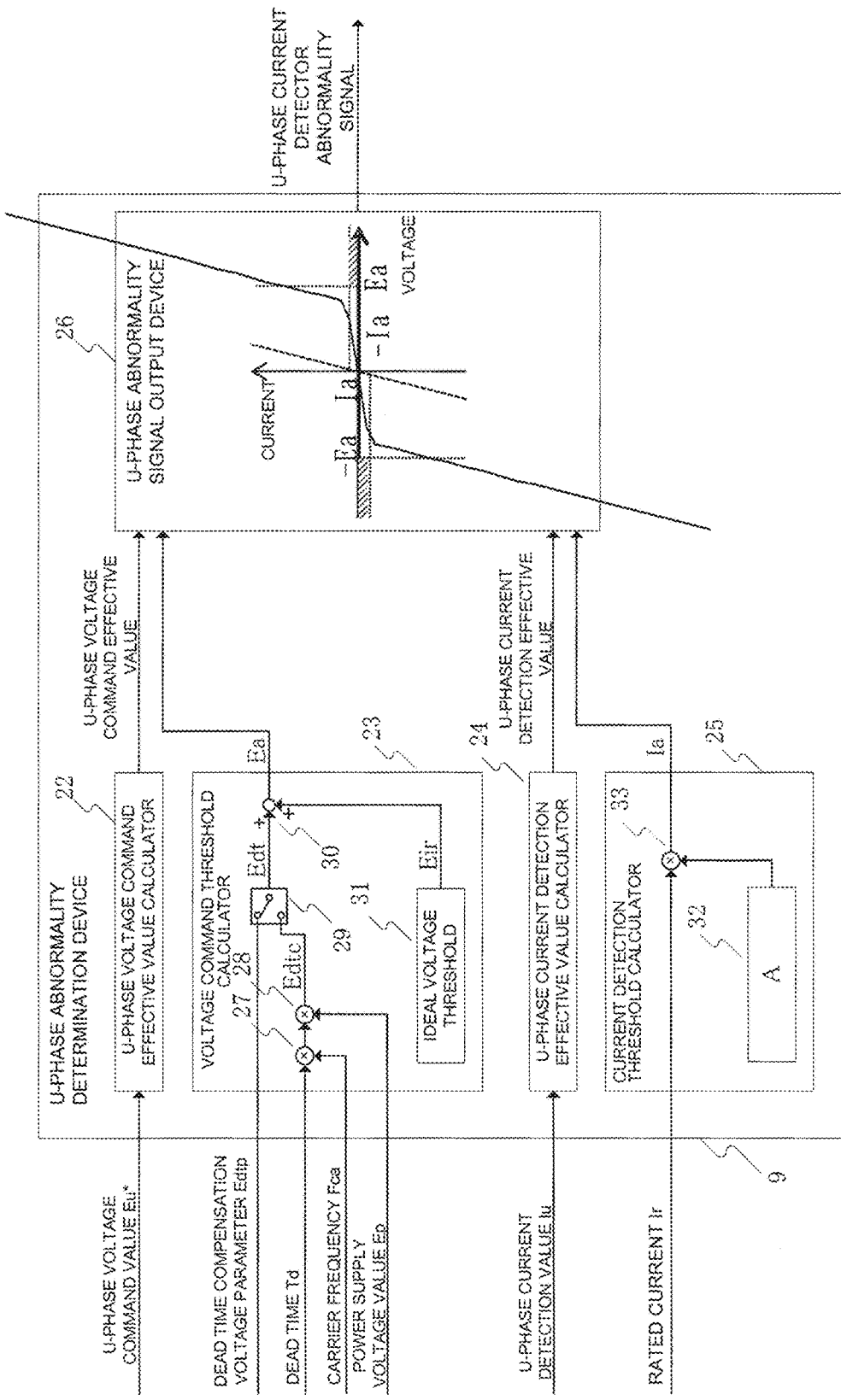
FIG. 4 is a drawing illustrating an exemplary configuration of a U-phase abnormality determination device.

Next, another exemplary technique for detecting any abnormality in the current detector will be described with reference to FIG. 4. FIG. 4 is a drawing illustrating an exemplary configuration of the U-phase abnormality determination device 9. The U-phase abnormality determination device 9 includes a U-phase voltage command effective value calculator 22, a voltage command threshold calculator 23, a U-phase current detection effective value calculator 24, a current detection threshold calculator 25, and a U-phase abnormality signal output device 26. The U-phase voltage command effective value calculator 22 obtains a U-phase voltage command effective value from the U-phase voltage command value Eu*. The U-phase current detection effective value calculator 24 obtains a U-phase current detection effective value from the U-phase current detection value Iu.

The voltage command threshold calculator 23 receives the dead time compensation voltage parameter Edtp in addition to the dead time Td, the carrier frequency Fca, and the power supply voltage value Ep. The dead time compensation voltage parameter Edtp is a value set for each motor, as described above, and is a dead time voltage error value after stabilization. The voltage command threshold calculator 23 calculates a dead time voltage error calculated value Edtc based on the following formula (5). That is, the dead time voltage error calculated value Edtc is a value obtained by multiplying the dead time Td by the carrier frequency Fca and the power supply voltage value Ep. Further, the voltage command threshold calculator 23 switches a switch 29 in such a manner that the larger of the dead time voltage error calculated value Edtc and the dead time compensation voltage parameter Edtp set for each motor is output as the dead time voltage error Edt.

$$Edtc=Td \times Fca \times Ep \quad (5)$$

$$Edt=\max(Edtp,Edtc) \quad (6)$$

The voltage command threshold calculator 23 calculates a voltage command threshold Ea by adding the dead time voltage error Edt to the ideal voltage command threshold Eir, as expressed by formula (1). For example, in the case of using, as the ideal voltage command threshold Eir, the ideal voltage value at the rated current obtained from the rated current Ir that can be continuously supplied and the motor resistance value, abnormalities can be promptly detected before current not smaller than the rated current Ir flows. The current detection threshold Ia is set as the value obtained by multiplying the rated current Ir by the appropriate multiplier "A" that is not smaller than 0 and is less than 1, as expressed in formula (2). In this case, circuit errors, calculation errors, and margins may be taken into consideration when setting the multiplier "A." However, for the sake of simplicity, under the assumption that a value close to 0 is output in the event of failure in the current detector, for example, the current detection threshold Ia may be set to be 0.5% of the rated current Ir.

The U-phase abnormality signal output device 26 determines that the current detector 7 is abnormal, when the U-phase voltage command effective value is equal to or greater than the voltage command threshold Ea and the U-phase current detection effective value is equal to or less than the current detection threshold Ia, and outputs a U-phase current detector abnormality signal to a superordinate control device (not illustrated). The V-phase abnormality determination device 10 performs processing similar to that of the U-phase abnormality determination device 9. However, since the voltage command threshold Ea and the current detection threshold Ia have the same value, they may be diverted.

Figure 5:
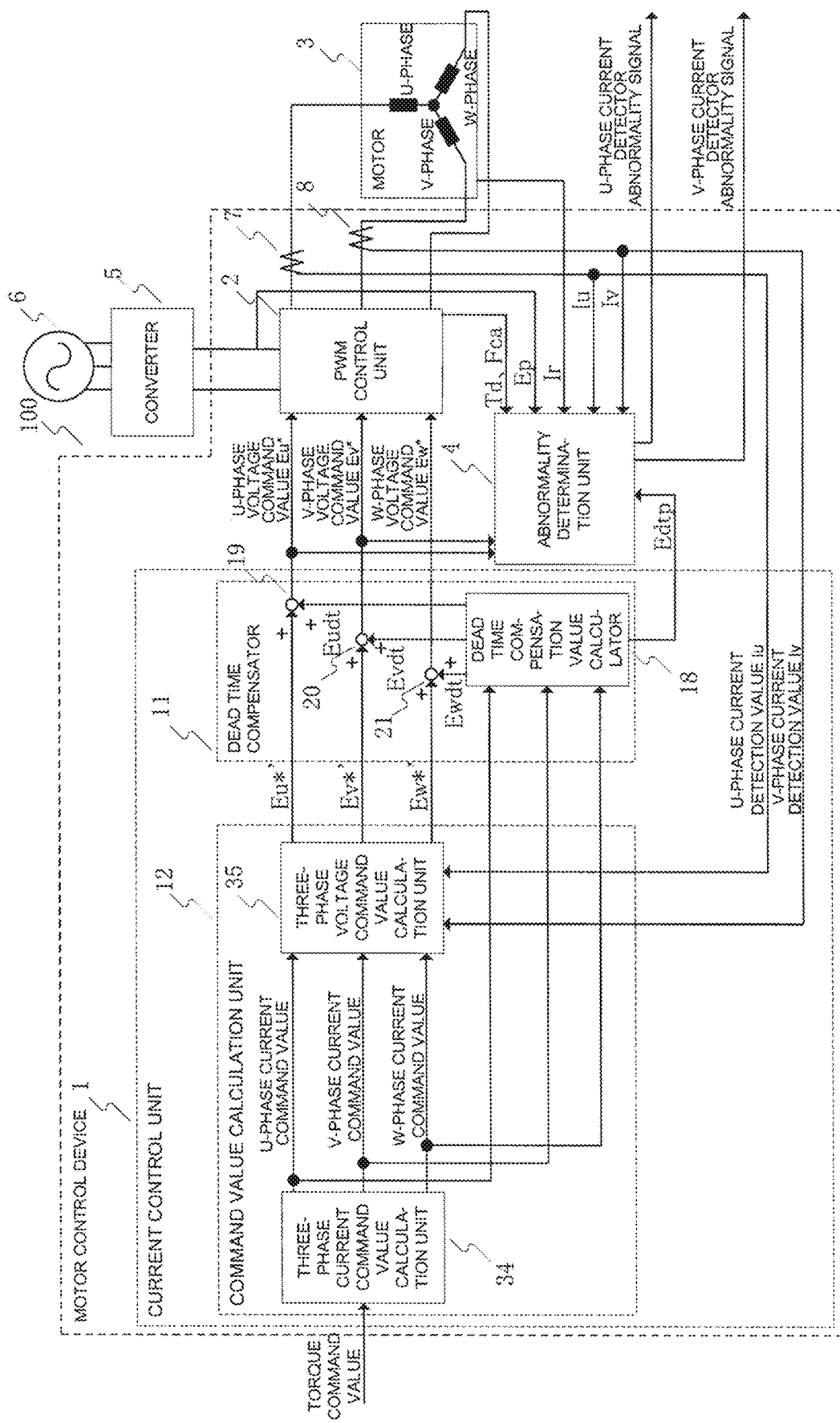
FIG. 5 is a block diagram illustrating another exemplary configuration of the motor control device.

Next, another exemplary technique for detecting any abnormality in the current detectors 7 and 8 will be described with reference to FIG. 5. A motor control device of FIG. 5 differs from the motor control device of FIG. 3 only in the internal configuration of the current control unit 1 and resembles the motor control device of FIG. 3 in other configurations. Accordingly, in the motor control device of FIG. 5, the same configurations as those of the motor control device of FIG. 3 are denoted by the same reference numerals and the description thereof will be omitted. In the motor control device of FIG. 5, three-phase feedback control is performed by the current control unit 1. The current control unit 1 includes a three-phase current command value calculation unit 34 and a three-phase voltage command value calculation unit 35, which are provided in a command value calculation unit 12. The three-phase current command value calculation unit 34 receives a torque command value output by a superordinate control device (not illustrated) and outputs a current command value for each of three phases. The three-phase voltage command value calculation unit 35 receives the current command value for each of three phases and the U-phase and V-phase current detection values and outputs voltage command values Eu*', Ev*', and Ew*' before dead time compensation. However, the configuration described here is a mere example, and the internal configuration of the current control unit 1 may be changed so long as the current control unit 1 outputs the voltage command value in the fixed coordinate system.

Further, the description so far is a mere example, and other configurations may be changed appropriately so long as a value reflecting the dead time voltage error Edt is used as the voltage command threshold Ea. For example, in the example of FIG. 4, the larger of the dead time voltage error calculated value Edtc and the dead time compensation voltage parameter Edtp is used as the dead time voltage error Edt to secure a margin and prevent any erroneous detection. However, selecting the smaller of the dead time voltage error calculated value Edtc and the dead time compensation voltage parameter Edtp and setting a stricter threshold may be desirable to prevent any detection failure. That is, the dead time voltage error Edt may be specified based on the following formula (7).

$$Edt=\min(Edtp, Edtc) \quad (7)$$

Further, even in the case of performing no dead time voltage compensation, a dead time voltage error parameter or the like may be separately provided instead of the dead time compensation voltage parameter and may be used when specifying the dead time voltage error Edt.

Further, in the above description, although the installation of the current detectors is limited to the U phase and the V phase, the phase of each current detector to be installed may be changed appropriately. Accordingly, in order to detect an abnormality in the current detector of each phase, a dedicated current detector may be installed for each of three phases. Alternatively, only one representative current detector may be installed for one of three phases.

In any case, according to the techniques disclosed in the present specification, it is possible to easily detect an abnormality in a current detector based on current-voltage characteristics in consideration of the dead time voltage error. Therefore, it is possible to prevent erroneous detection due to the dead time voltage error or prevent a current exceeding the rated current from flowing in the event of an abnormality.

REFERENCE SIGNS LIST

1: current control unit
2: PWM control unit
3: three-phase motor
4: abnormality determination unit
5: converter
6: three-phase AC power supply
7, 8: current detector
9: U-phase abnormality determination device
10: V-phase abnormality determination device
11: dead time compensator
12: command value calculation unit
13: dq-axis current command value calculation unit
14: dq-axis voltage command value calculation unit
15, 16: three-phase converter
17: dq converter
18: dead time compensation value calculator
19: 20, 21: adder
22: U-phase voltage command effective value calculator
23: voltage command threshold calculator
24: u-phase current detection effective value calculator
25: current detection threshold calculator
26: U-phase abnormality signal output device
27: 28, 33: multiplier
29: switch
30: adder
31: 32: parameter
34: three-phase current command value calculation unit
35: three-phase voltage command value calculation unit
100: motor control device

The invention claimed is:

1. A motor control device that controls driving of a three-phase motor, comprising:
a current control unit configured to output a voltage command value for each of three phases;
a PWM control unit configured to convert a DC voltage output from a converter into an AC voltage by modulating a pulse width of switching according to the voltage command value and apply the converted voltage to a power line of each of three phases of the three-phase motor;
one or more current detectors provided for at least one of three-phase power lines to detect the value of current flowing through the power line, as a current detection value; and
an abnormality determination unit configured to determine the presence of any abnormality in the current detector,
wherein the abnormality determination unit
calculates, as a voltage command threshold, a value obtained by adding a dead time voltage error that is a voltage error occurring due to a dead time of the switching to an ideal voltage command threshold that is a value obtained by multiplying a prescribed reference current value by a motor resistance value, and
outputs a signal indicating an abnormality in the current detector when the effective value of the voltage command value is equal to or greater than the voltage command threshold and the effective value of the current detection value is equal to or less than a current detection threshold that is lower than the reference current value.

2. The motor control device according to claim 1, wherein the abnormality determination unit calculates, as the dead time voltage error, a value obtained by multiplying the dead time by a carrier frequency and a power supply voltage value of the DC voltage.

3. The motor control device according to claim 1, wherein the current control unit includes a dead time compensator that outputs, as the voltage command value for each of three phases, a value obtained by adding a dead time compensation value to a pre-compensation voltage command value for each of three phases calculated based on a torque command value,
when a current command value exceeds a prescribed dead time compensation current parameter, the dead time compensator calculates the dead time compensation value that is equal to a prescribed dead time compensation voltage parameter, and
when the current command value is equal to or less than the dead time compensation current parameter, the dead time compensator calculates the dead time compensation value that is a value obtained by multiplying the dead time compensation voltage parameter with a ratio of the current command value to the dead time compensation current parameter.

4. The motor control device according to claim 3, wherein the abnormality determination unit calculates, as the dead time voltage error, a value obtained by multiplying the dead time by a carrier frequency and a power supply voltage value of the DC voltage.

5. The motor control device according to claim 3, wherein the abnormality determination unit calculates the dead time voltage error that is equal to the dead time compensation voltage parameter.

6. The motor control device according to claim 3, wherein the abnormality determination unit calculates, as a dead time voltage error calculated value, a value obtained by multiplying the dead time by a carrier frequency and a power supply voltage value of the DC voltage, and calculates, as the dead time voltage error, the larger of the dead time compensation voltage parameter and the dead time voltage error calculated value.

7. The motor control device according to claim 3, wherein the abnormality determination unit calculates, as a dead time voltage error calculated value, a value obtained by multiplying the dead time by a carrier frequency and a power supply voltage value of the DC voltage, and calculates, as the dead time voltage error, the smaller of the dead time compensation voltage parameter and the dead time voltage error calculated value.

8. An abnormality detection method for a current detector provided in a motor control device, comprising:
  calculating, as a voltage command threshold, a value obtained by adding a dead time voltage error that is a voltage error occurring due to a dead time of switching for applying voltage to a motor to an ideal voltage command threshold that is a value obtained by multiplying a prescribed reference current value by a motor resistance value; and
  outputting a signal indicating an abnormality in the current detector when the effective value of a voltage command value is equal to or greater than the voltage command threshold and the effective value of a current detection value detected by the current detector is equal to or less than a current detection threshold that is lower than the reference current value.

* * * * *